United States Patent
Seo

(10) Patent No.: US 7,743,809 B2
(45) Date of Patent: Jun. 29, 2010

(54) HOT-AIR FABRIC WELDER FOR WATERPROOFING TAPE

(76) Inventor: Gi-Won Seo, 509-14 Dongpae-Ri, Kyoha-Eup, Paju-City, Kyungki-Do 413-833 (KR)

(*) Notice: Subject to any disclaimer, the term of this patent is extended or adjusted under 35 U.S.C. 154(b) by 379 days.

(21) Appl. No.: 11/987,836

(22) Filed: Dec. 5, 2007

(65) Prior Publication Data
US 2008/0308234 A1    Dec. 18, 2008

(30) Foreign Application Priority Data

| Jun. 12, 2007 | (KR) | ...................... 10-2007-0057061 |
| Jul. 13, 2007 | (KR) | ...................... 10-2007-0070486 |
| Aug. 1, 2007 | (KR) | ...................... 10-2007-0077254 |

(51) Int. Cl.
  B32B 37/00   (2006.01)
(52) U.S. Cl. .................. 156/497; 156/499; 156/555
(58) Field of Classification Search ............. 156/82, 156/497, 499, 555, 582
  See application file for complete search history.

(56) References Cited

U.S. PATENT DOCUMENTS

| 4,950,352 | A | * | 8/1990 | Greller ....................... 156/497 |
| 6,053,230 | A | * | 4/2000 | Pelland ....................... 156/359 |
| 6,129,809 | A | * | 10/2000 | Ellenberger et al. .......... 156/351 |
| 6,471,803 | B1 | * | 10/2002 | Pelland et al. ................ 156/64 |
| 6,701,991 | B2 | * | 3/2004 | Seo ............................. 156/497 |

* cited by examiner

Primary Examiner—James Sells
(74) Attorney, Agent, or Firm—G W I P S

(57) ABSTRACT

A hot-air fabric welder for waterproofing tape is invented for selectively welding straight portions and arc portions. The hot-air fabric welder for waterproof tape is comprised of: a lower roller unit including a flat roller portion and a tapered roller portion mounted to the upper end of a support. The lower roller unit is divided into a flat roller body and a tapered roller body for selectively positioning into contact with the upper roller, so that the surface of the lower roller unit contacts the upper roller. A driving means is provided for rotating the lower roller unit. A pivoting means is provided for rotating the support on which the lower roller unit is mounted for selective use of the flat roller portion or the tapered roller portion. A hot-air generating unit is linked to the lower roller unit, driving unit and pivoting unit, and an upper roller is arranged above the lower roller unit.

18 Claims, 18 Drawing Sheets

HOT-AIR FABRIC WELDER FOR WATERPROOFING TAPE

BACKGROUND OF THE INVENTION

1. Field of the Invention

The present invention relates to a hot-air fabric welder for waterproofing tape which completely waterproofs a seam portion by heat-welding a synthetic resin tape on the seam portion of a product made of a waterproof sheet such as a tent, raincoat, jumper, hat or ski suit, and more specifically to a hot-air fabric welder for waterproofing tape for manufacturing both a straight-line heat-welded portion and an arc-shaped heat-welded portion through selective use of a flat roller portion or a tapered roller portion in opposition to the upper roller, by configuring the appropriate part of the lower roller unit in opposition to the upper roller.

2. Related Prior Art

In general, for products that need waterproofing such as a tent, raincoat, jumper, hat or ski suit, complete waterproofing is possible for the waterproof sheet, but pinholes are perforated along the seam in the process of sewing it. Therefore, for waterproofing of the perforated part, complete waterproofing treatment is done by affixing a synthetic resin tape to the seam portion by heat welding.

At this time, a wide or narrow tape of synthetic resin should be used depending on the characteristics of the product or the width of the seam and in relation to this, a wide or narrow support roller also should be utilized for complete waterproofing treatment of the product.

But because it is not possible for a conventional tape welder to utilize a wide or narrow support roller depending on the width of the synthetic resin tape, it has been used as it is. Further, an extra tape welder, such as a tape welder having a wide support roller or a tape welder having a narrow support roller, needs to be provided depending on the width of the synthetic resin tape. Because of that, using a tape welder of one kind regardless of the width of the synthetic resin has many problems such as a high rejection rate of the product or an enormous cost if different tape welders are provided according to the width of the synthetic resin tape.

However, since the conventional hot-air fabric welder for waterproofing tape has flat upper roller and lower roller units, it is possible to heat-weld only a straight seam with a waterproof tape. Because it is possible to process the roller only in a straight line due to the characteristics of the flat roller, it is possible to heat-weld only a straight waterproof tape to the seam of various products made of waterproof fabric. Therefore, various constraints limit the process of heat-welding the waterproof tape to a seam having various curve shapes such as a neck portion, shoulder, chest and sleeve, when using a conventional hot air welder. In order to produce products made of waterproof sheet of synthetic resin with curved surfaces such as a tent, raincoat, jumper, hat or ski suit, the worker makes the product by putting it in by force and rotating it along the relevant curvature by force, so creases occur in the welding portion of the waterproof tape due to overlapping of the product fabric or the waterproof tape, which causes the appearance to be not beautiful and lowers the marketability of the product.

SUMMARY OF THE INVENTION

Accordingly, it is an object of the present invention to provide a hot-air fabric welder for waterproof tape, wherein a lower roller unit corresponding to an upper roller body is divided into a flat roller portion and a tapered roller portion, and a support that supports the lower roller unit is rotated so as to position either the flat roller portion or the tapered roller portion of the lower roller unit below the upper roller, so that it is possible to carry out work continuously by selecting the tapered roller portion to work on an arc section, and selecting the flat roller portion to work on a straight section, according to the form or shape of the waterproof product being made or the shape of the waterproof work section.

To achieve the above objects, there is provided a hot-air fabric welder for waterproof tape comprising: a lower roller unit which is mounted at the upper end of the support and is divided into a flat roller portion and a tapered roller portion; a driving means for rotating the lower roller unit; a pivoting means for rotating the support that has said lower roller unit mounted thereon for selective use of the flat roller portion or tapered roller portion; a hot-air generating means which is operated in concert with the lower roller unit, driving means and pivoting means; and an upper roller which is arranged above the lower roller unit.

According to the present invention, it is possible to use the flat roller portion or tapered roller portion selectively by adjusting the angle of the support, so it is possible to obtain a heat-welded portion having an arc-shaped natural curve through contact rotation between the tapered roller portion and the upper roller. Thereby it is possible not only to manufacture waterproof products such as a tent, raincoat, jumper, and hat or ski suit having curved seams, but also to obtain an excellent watertight effect because there are no crinkles or overlaps in the heat-welded portion.

Furthermore, according to the hot-air fabric welder for waterproof tape of the present invention, productivity is improved and waterproof tape of much better welding quality can be obtained stably, because quick and stable welding work is possible for the relevant section through selective application of the flat roller portion or tapered roller portion, even if straight sections or arc sections repeat or continue.

DETAILED DESCRIPTION OF THE INVENTION

Preferred embodiments of the present invention will now be described in detail with reference to the accompanying drawings.

Figure 1:
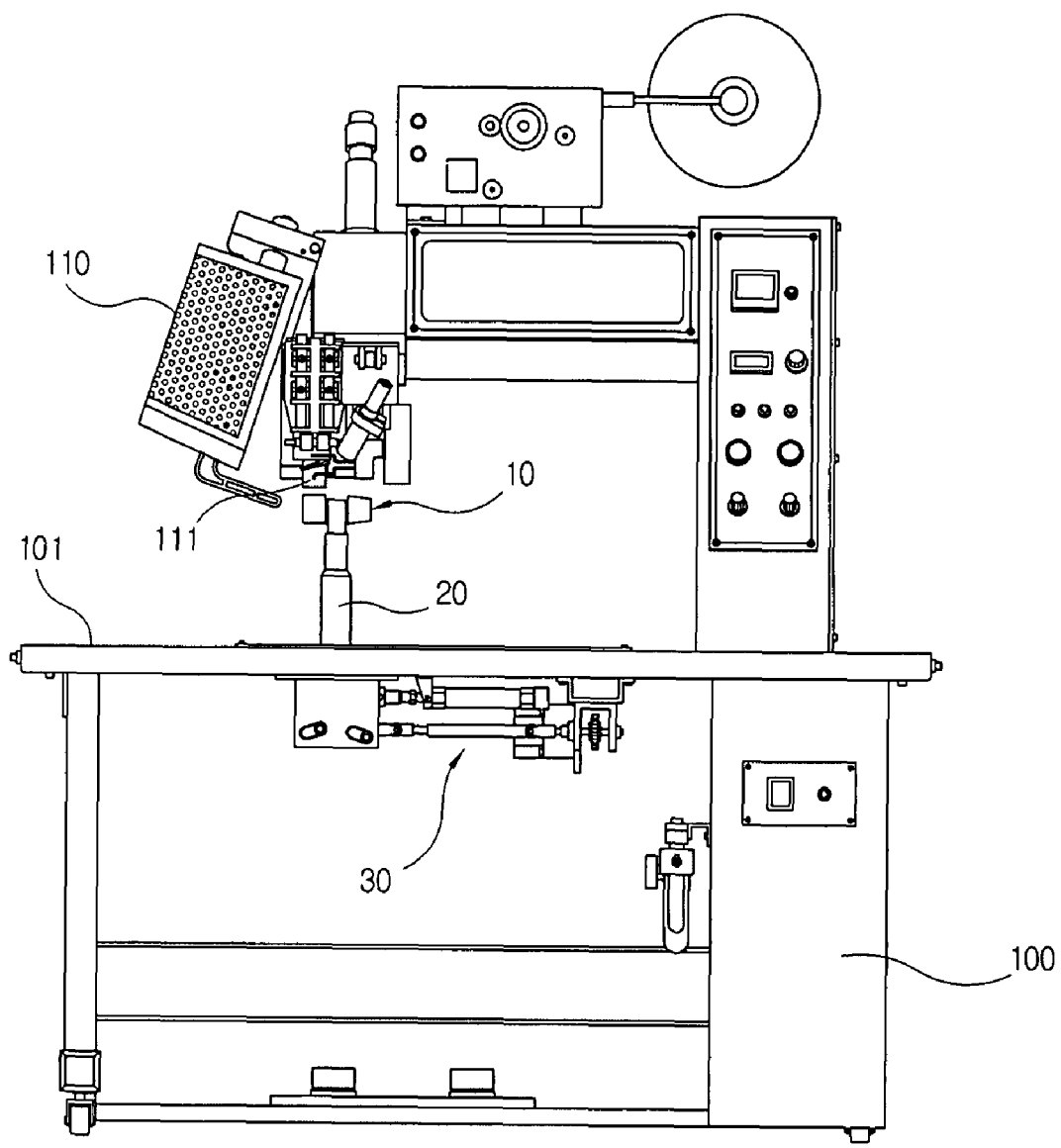
FIG. 1 is a front view showing the entire hot-air fabric welder for waterproof tape according to the present invention.

FIG. 1 is a front view showing the entire hot-air fabric welder for waterproofing tape of the present invention.

As shown in the drawings, the hot-air fabric welder for waterproofing tape of the present invention is provided with a main body 100 having a flat work table 101, a hot-air generating means 110, and an upper roller 111 facing downward on the work table 101 of the main body 100.

Below the upper roller 111 is positioned a lower roller unit 10 which is installed at the upper end of a support 20 on the work table 101. The present invention enables a single hot-air fabric welder to carry out waterproof work on a straight section or waterproof work on an arc section according to the form of the object of waterproof work through various embodiments of the lower roller unit 10. Also, by rotating the support 20 that has the lower roller unit 10 mounted thereon, a flat roller portion 10a or tapered roller portion 10b of the lower roller unit 10 is selectively placed for use below the upper roller 111. Accordingly, it enables continuous welding work on waterproof tapes containing both straight sections and arc sections.

First Embodiment

Figure 2:
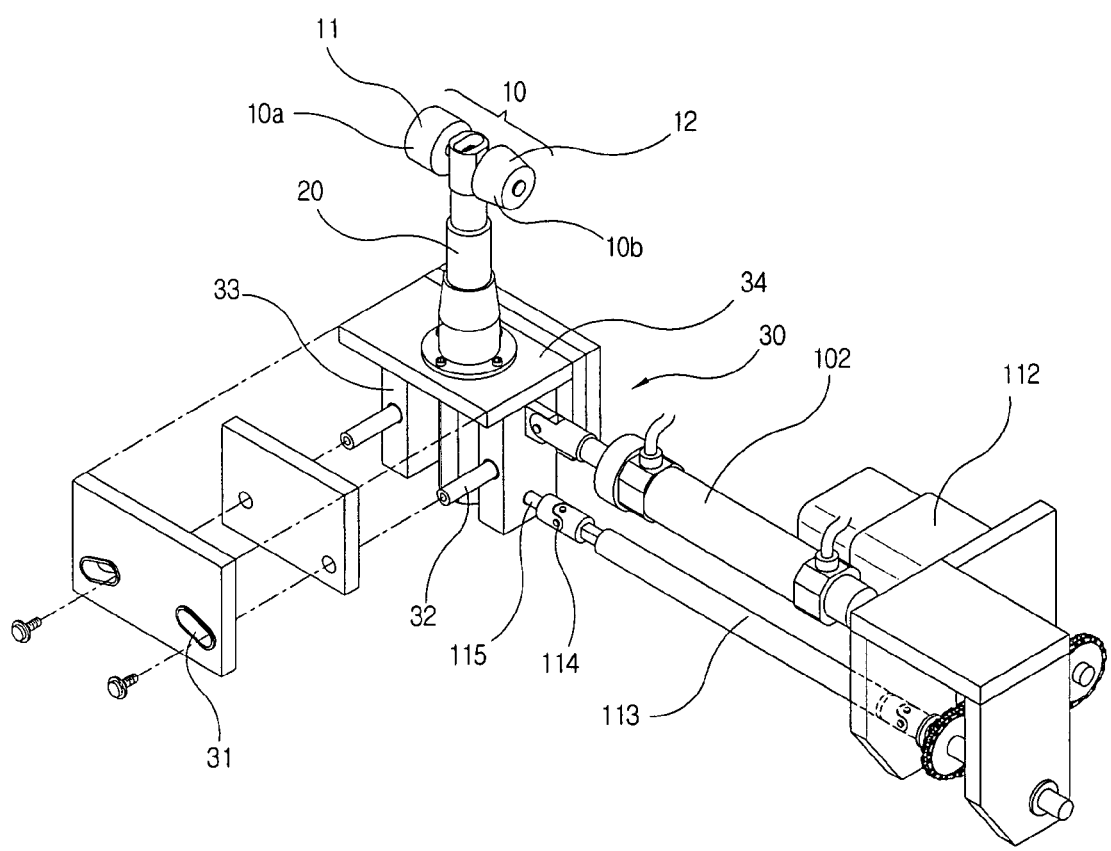
FIG. 2 is a perspective view showing the lower roller unit and the drive unit of a waterproof tape hot-air fabric welder according to a first embodiment of the present invention.
Figure 3:
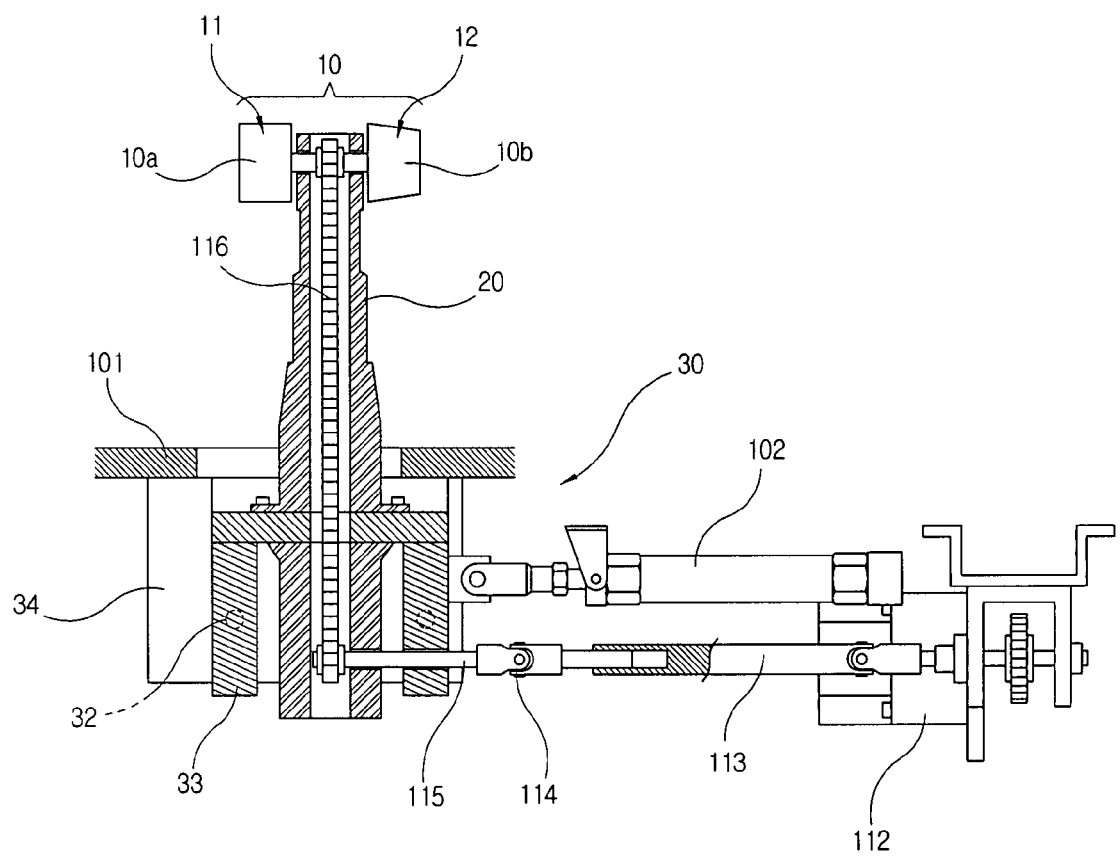
FIG. 3 is a sectional view showing the assembly of the lower roller and the drive unit illustrated in FIG. 2.

FIG. 2 is a perspective view showing the lower roller unit and the drive unit of a waterproof tape hot-air fabric welder according to a first embodiment of the present invention, and FIG. 3 is a sectional view showing the assembly of the lower roller and the drive unit illustrated in FIG. 2.

In the present embodiment, the lower roller unit 10 is formed by dividing it into a flat roller body 11 and a tapered roller body 12, respectively, and these are joined to both sides of the upper end of the support 20. When the flat roller portion 10a of the flat roller body 11 rotates in correspondence to the upper roller 111, the rotation velocity of both ends is uniform, so it plays a role of moving the object of waterproof work in a straight line.

When the tapered roller portion 10b of the tapered roller body 12 rotates in correspondence to the upper roller 111, the rotation velocity of both ends are different from each other, so the object of waterproof work moves in an arc form in proportion to the taper angle of the tapered roller portion 10b.

Therefore, in the case of working with the lower roller unit 10 corresponding to the upper roller 111 by selecting either the flat roller body 11 or the tapered roller body 12, straight section work or arc section work is possible.

At this time, the axis on which the tapered roller body 12 and the flat roller body 11 are mounted is rotated by power transmitted via the chain 116 from the drive motor 112 installed inside of the main body 100. By rotation of the tapered roller body 12 and the flat roller body 11, it is possible to transport the product of waterproof fabric to be worked on, and in the process of transporting the waterproof product, the waterproof tape that is applied in close contact with the seam is heated and melted by the heat generated from the hot-air generating means 110 to make the waterproof tape adhere to the seam for obtaining a completely watertight condition.

Such a tapered roller body 12 and a flat roller body 11 of the lower roller unit 10 can be placed individually below the upper roller 111 through selective position change by the worker. Such a position change action becomes possible by adjusting the angle of the support 20 which is driven by the drive of a pivoting means 30.

Namely, to the bottom end of the support 20 is assembled a guide block 34 mounted beneath the work table 101, and into the slit holes 31 formed on both sides of the guide block 34 are inserted guide pins 32. Accordingly, the guide pins 32 protruding from the support 20 are movably inserted into the slit holes 31 of the guide block 34, so it is possible to change the angle of the support 20.

At the bottom end of the support 20, the movable block 33 is inserted inside of the guide block 34, and the guide pins 32 protrude from both sides of the movable block 33. In the movable block 33, the end portion of the actuator 102 mounted underneath of the work table 101 is assembled by a hinge, so the movable block 33 can be pivoted to the left and right by the drive of the actuator 102.

Further, the chain 116 is installed inside the support 20 that rotates the tapered roller body 12 and the flat roller body 11, and the lower part of the chain 116 is connected to the power transmission axle 113 drawn out from the drive motor 112 through a universal joint 114 and a rotating axle 115. To the end portion of the power transmission axle 113 is connected the rotating axle 115 through a coupling means such as the universal joint 114 that can transmit power within a predetermined range of angles. Therefore, the rotating axle 115 that rotates the chain 116 passing through the movable block 33 has continuous power transmission via the universal joint 114 even while the movable block 33 is rotating or the angle is being adjusted.

Figure 4:
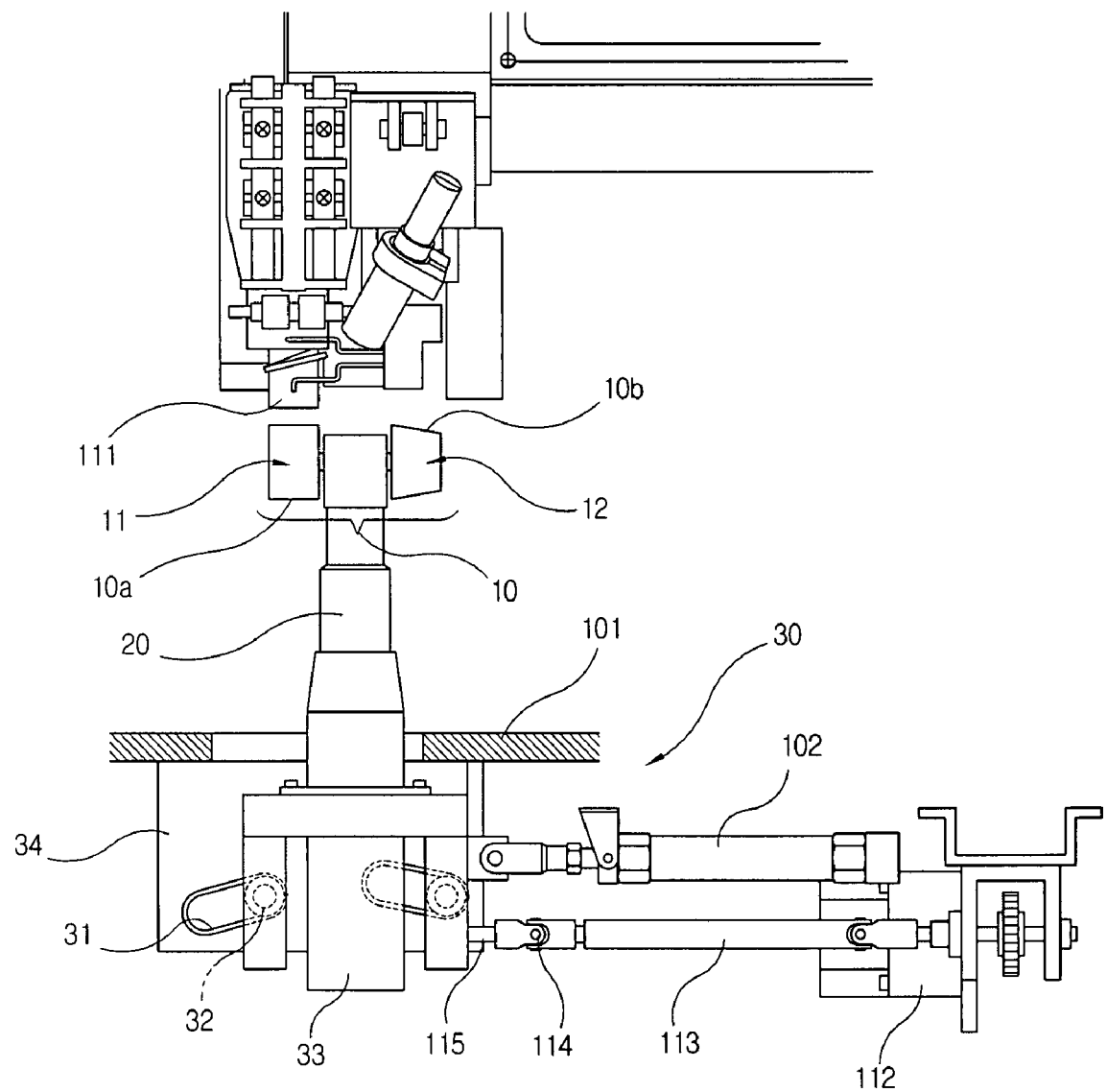
FIG. 4 is a sectional view showing the condition in which welding work is carried out on a straight section by the hot-air fabric welder illustrated in FIG. 3.

Therefore, in order to weld a waterproof tape to a straight seam, the actuator 102 is moved back as shown in FIG. 4. Thereby the movable block 33 installed inside of the guide block 34 is moved back, and at the same time when the guide pins 32 of the movable block 33 are moved all the way to one end of the slit holes 31, the support 20 becomes vertical due to the rotational action of the movable block 33. In such a vertical position of the support 20, the flat roller body 11 is positioned below the upper roller 111.

In this condition, if the drive motor 112 installed inside of the main body 100 is operated and the hot-air generating means 110 is operated, the waterproof tape is heat-welded along the straight seam of the waterproof product. In this way, the upper roller 111 and the flat roller body 11 of the lower roller unit 10 are maintained in parallel with each other, so the waterproof product and waterproof tape passing between these rollers 111, 11 move in a straight line to make a straight hot-air welded portion.

Meanwhile, in order to form a hot-air welded portion of waterproof tape in a curved shape, the actuator 102 mounted underneath the work table 101 of the main body 100 is operated to move forward the movable block 33 assembled to the end portion. Accordingly, the guide pins 32 of the movable block 33 are moved along the inclined slit holes 31, and the movable block 33 and the support 20 will maintain an inclined position according to the angle of inclination of the slit holes 31.

Figure 5:
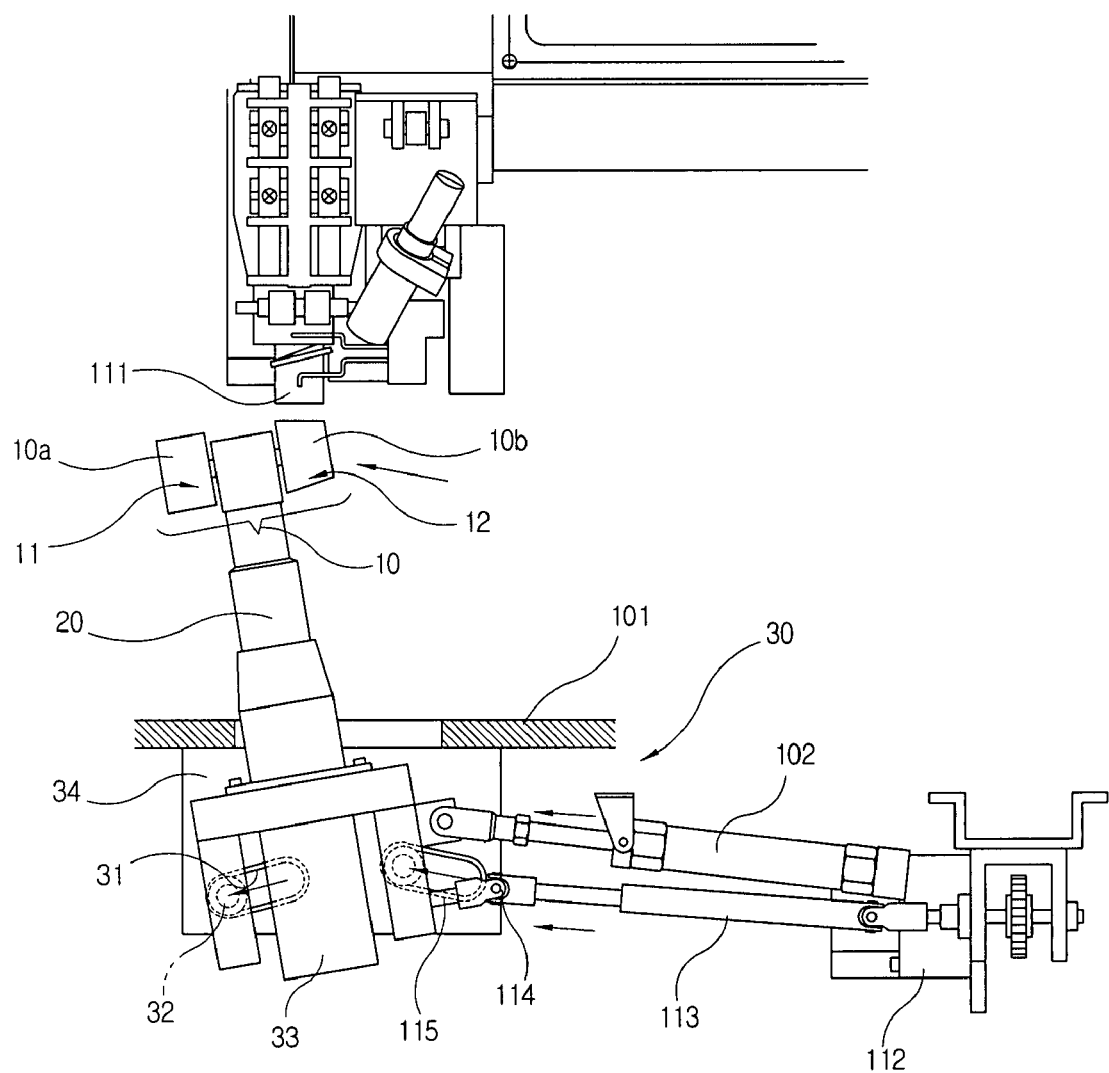
FIG. 5 is a sectional view showing the condition in which welding work is carried out on an arc section by the hot-air fabric welder illustrated in FIG. 3.

As shown in FIG. 5, in such an inclined position, the tapered roller body 12 of the lower roller unit 10 comes to be positioned below the upper roller 111. Therefore, if the waterproof product and waterproof tape are moved in close contact by the rotation of the tapered roller body 12, the waterproof product and the waterproof tape are moved in a curved shape due to the tapered shape of the tapered roller body 12.

Accordingly, in the case of forming a curved waterproof tape heat-welded portion, if work is performed after activating the tapered roller body 12 of the lower roller unit 10 as described above, the waterproof product and the waterproof tape are moved in a curve by the tapered shape of the tapered roller body 12, so eventually a gently curved waterproof tape welded portion is formed along the curved seam.

At this time, it is possible to form waterproof tape heat-welded portions having more varied curves by replacing the tapered roller body 12 as necessary with rollers of different taper angles. Namely, if using a combination of tapered roller bodies 12 of proper shapes suited to the forms of the waterproof portion or seam of the raincoat, jumper, hat or ski suit to be made, curved heat-welded portions suited to the forms of the seam can be obtained.

Therefore, by selectively using the tapered roller body 12 and flat roller body 11 according to the need of the worker or the content of the work, it is possible to form a straight heat-welded portion or a curved heat-welded portion respectively, so more economic and effective use is possible.

Second Embodiment

Figure 6:
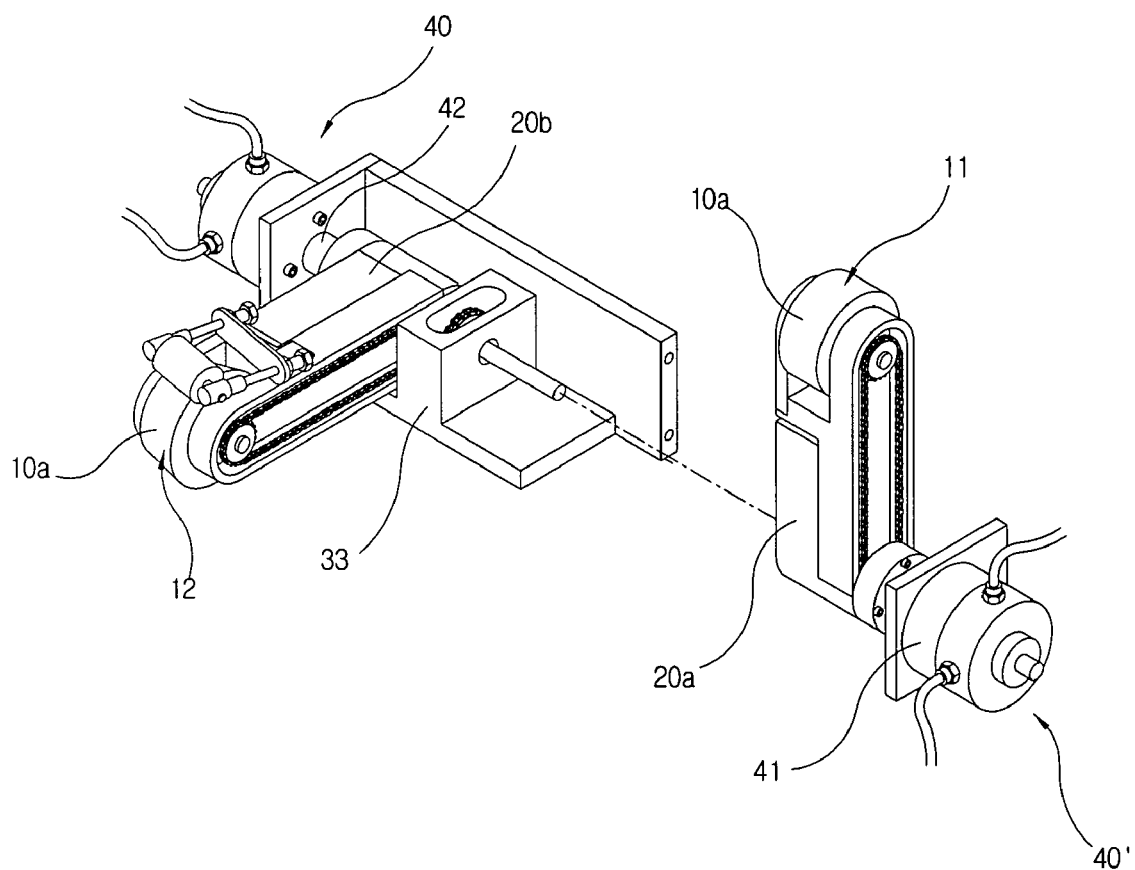
FIG. 6 is an exploded perspective view showing the lower roller unit and the drive unit of a waterproof tape hot-air fabric welder according to a second embodiment of the present invention.
Figure 7:
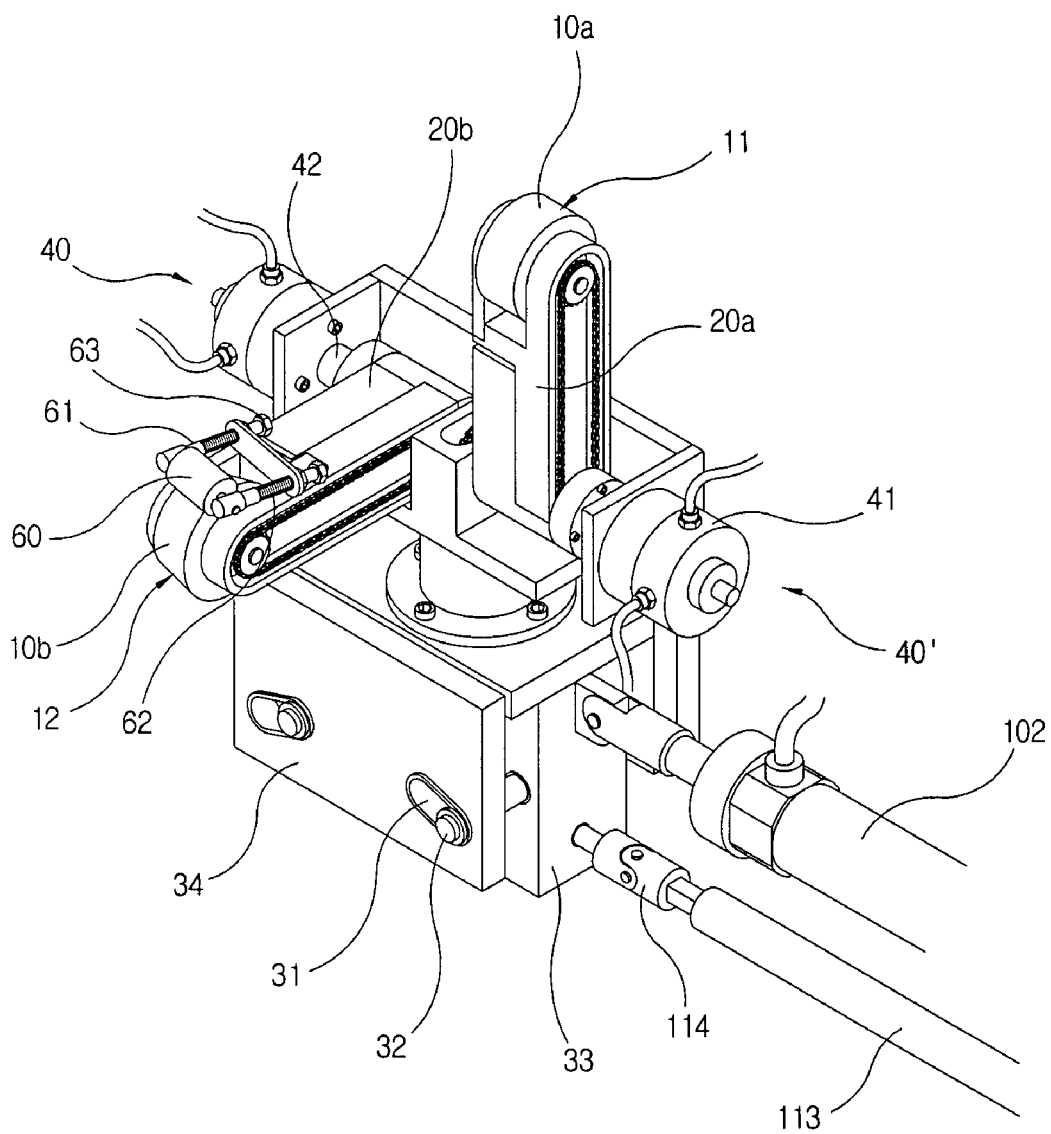
FIG. 7 is a perspective view showing the lower roller unit and the drive unit of the waterproof tape hot-air fabric welder according to the second embodiment of the present invention.

FIG. 6 is an exploded perspective view showing the lower roller unit and the drive unit of a waterproof tape hot-air fabric welder according to a second embodiment of the present invention, and FIG. 7 is a perspective view showing the lower roller unit and the drive unit of the waterproof tape hot-air fabric welder according to the second embodiment of the present invention.

As mentioned above with FIG. 1, the hot-air fabric welder for waterproofing tape of the present invention is provided with a hot-air generating means 110 and an upper roller 111 facing downward on the work table 101 of the main body 100. Below the upper roller 111 are arranged a flat roller body 11 having a flat roller portion 10a and a tapered roller body 12 having a tapered roller portion 10b separated by first and second supports 20a, 20b protruding above the work table 101.

At this time, the flat roller body 11 and tapered roller body 12 are rotatably fitted at the upper ends of the first support 20a and second support 20b, and the bottom ends of the first support 20a and second support 20b are hinged by pivoting axes 42 on a separate movable block 33.

Figure 8:
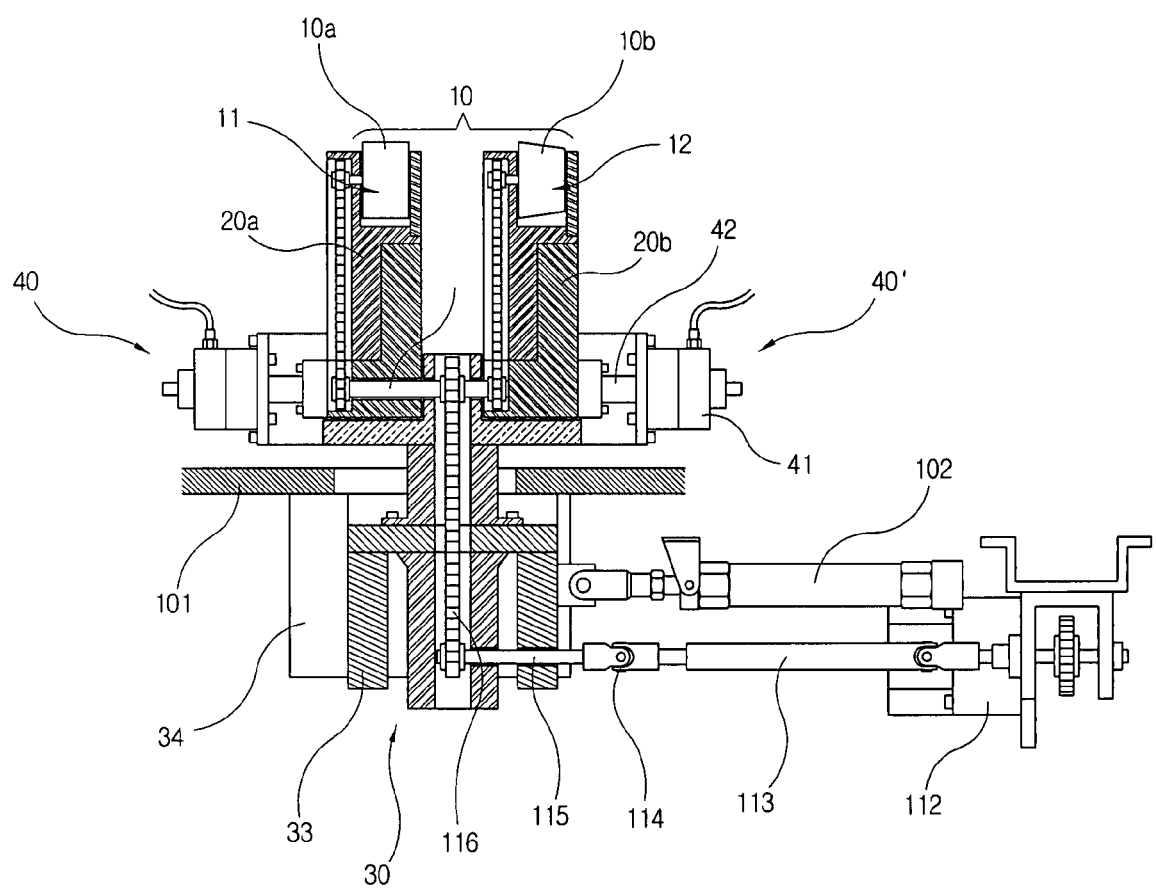
FIG. 8 is a sectional view showing the lower roller unit and the drive unit of the waterproof tape hot-air fabric welder according to the second embodiment of the present invention.

And, on both sides below the first support 20a and second support 20b are joined operating means 40, 40' respectively for pivoting these. It is preferable that the operating means 40, 40' use a hydraulic motor 41 or hydraulic cylinder as illustrated. The pivoting axes 42 of these operating means 40, 40' are joined at the bottom ends of the supports 20a, 20b, respectively, and are connected to hydraulic motors 41. When one of the hydraulic motors 41 is operated in this condition, the first support 20a or the second support 20b is pivoted roughly at a right angle on the movable block 33 as shown in FIG. 8.

Figure 9:
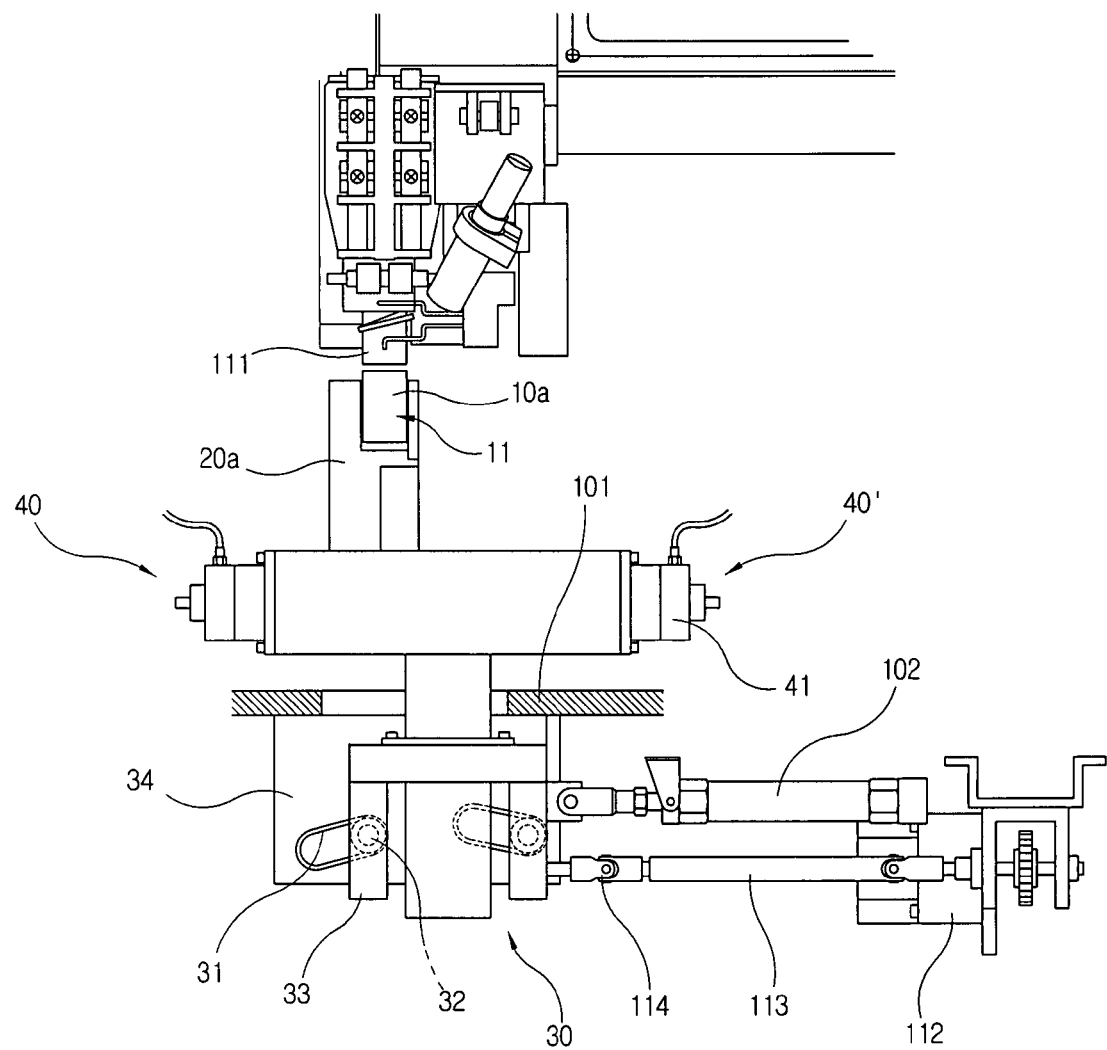
FIG. 9 is a sectional view showing the condition in which welding work is carried out on a straight section by the hot-air fabric welder illustrated in FIG. 6.
Figure 10:
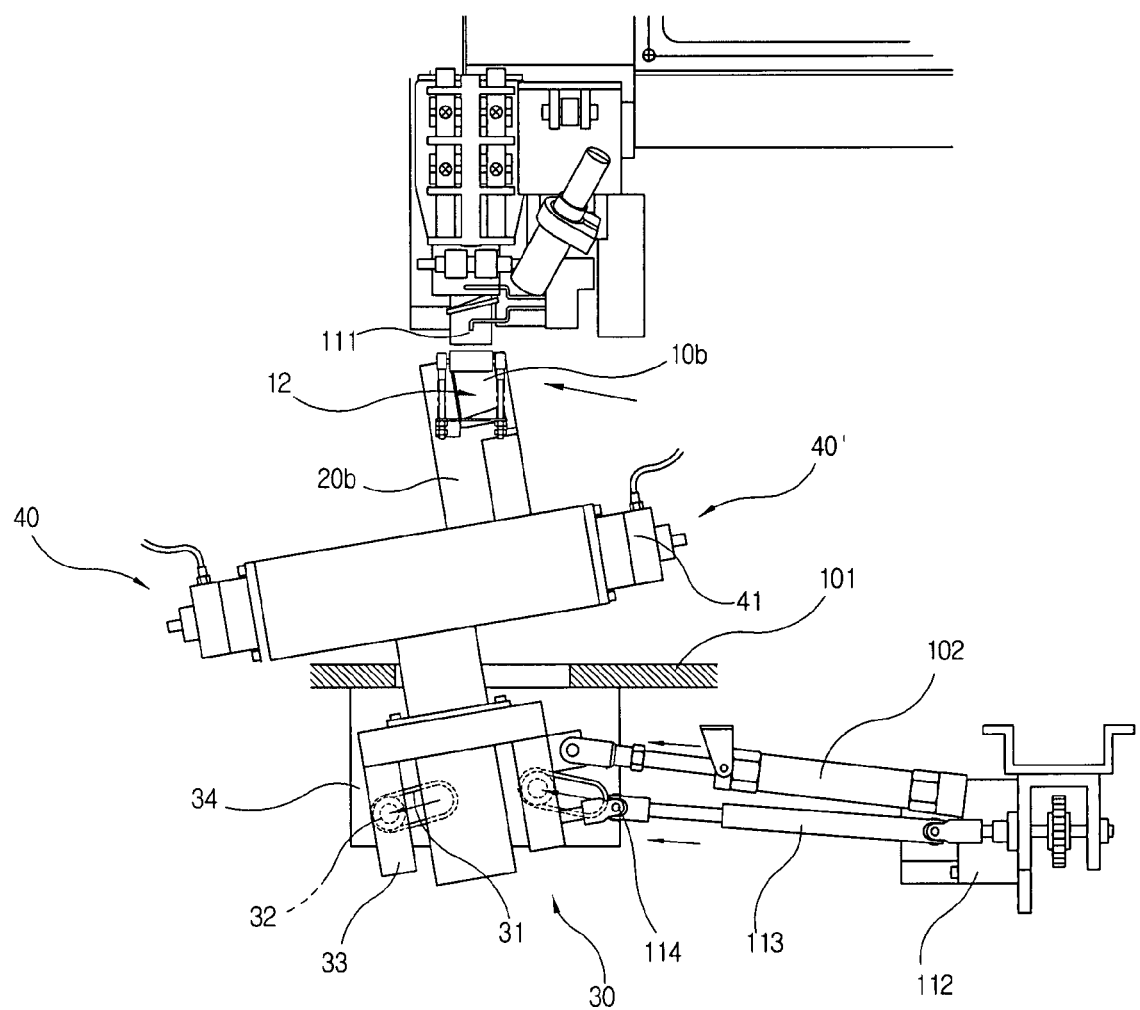
FIG. 10 is a sectional view showing the condition in which welding work is carried out on an arc section by the hot-air fabric welder illustrated in FIG. 6.

Accordingly, as shown in FIG. 9, when the flat roller body 11 is to be used, the first support 20a having the flat roller body 11 stands vertically to be positioned below the upper roller 111, while the tapered roller body 12 is pivoted horizontally to avoid interference between the rollers. Conversely, when the tapered roller body 12 is to be used, as shown in FIG. 10, the second support 20b stands vertically to position the tapered roller body 12 below the upper roller 111, while the first support 20a fitted with the flat roller body 11 is pivoted horizontally to likewise avoid interference between the rollers.

At this time, as described above, the flat roller body 11 and tapered roller body 12 are separated from each other, and they cannot come into surface contact exactly below the upper roller 111 through a simple pivoting operation, so the movable block 33 on which the first support 20a and second support 20b are joined is pivoted left or right. By dint of this, the flat roller body 11 and tapered roller body 12 can be selectively arranged exactly in the position of surface contact with the upper roller 111.

The left and right pivoting operation of the movable block 33 is accomplished by an actuator 102 fitted underneath the work table 101 of the main body 100. Underneath the work table 101 is fitted a guide block 34 with slit holes 31 punched on both sides, and inside of the guide block 34 is fitted the movable block 33 having guide pins 32 inserted into the slit holes 31. When the actuator 102 is linked by a coupling means such as a universal joint 114 to one side of the movable block 33, the movable block 33 is moved by the drive of the actuator 102 along the slit holes 31, enabling the flat roller body 11 or tapered roller body 12 to change its position.

Further, a drive motor 112 for rotating the flat roller body 11 and the tapered roller body 12 is installed inside of the main body 100. The power of the drive motor 112 is transmitted to the power transmission axle 113, the universal joint 114, and a rotating axle 115 (FIG. 8) inserted transversely through the bottom ends of the first support 20a and second support 20b. Since the power transmission axle 113 is operatably connected to the flat roller body 11 and tapered roller body 12 by the transmission axle 113, universal joint 114, rotating axle 115, and a chain 116, when the drive motor 112 is operated the flat roller body I1 and tapered roller body 12 are rotated simultaneously by the power transmission axle 113, universal joint 114, rotating axle 115, and the chain 116.

Accordingly, to waterproof the seam of various products made of water proof sheet, the flat roller body 11 or the tapered roller body 12 is selected according to the shape of the portion to be hot-air welded with waterproof tape, that is, according to the straight section or arc section, and the appropriate roller is rotated to a vertical position, then the position of the roller body is adjusted using the lower movable block 33 to make it exactly come into surface contact with the upper roller 111. When the drive motor 112 is operated in this manner, the waterproof fabric and waterproof tape, being moved between the upper roller 111 and the roller below, are melted and fused by the high-temperature air discharged from the hot-air generating means 110 and hot-air welded securely together.

Figure 11:
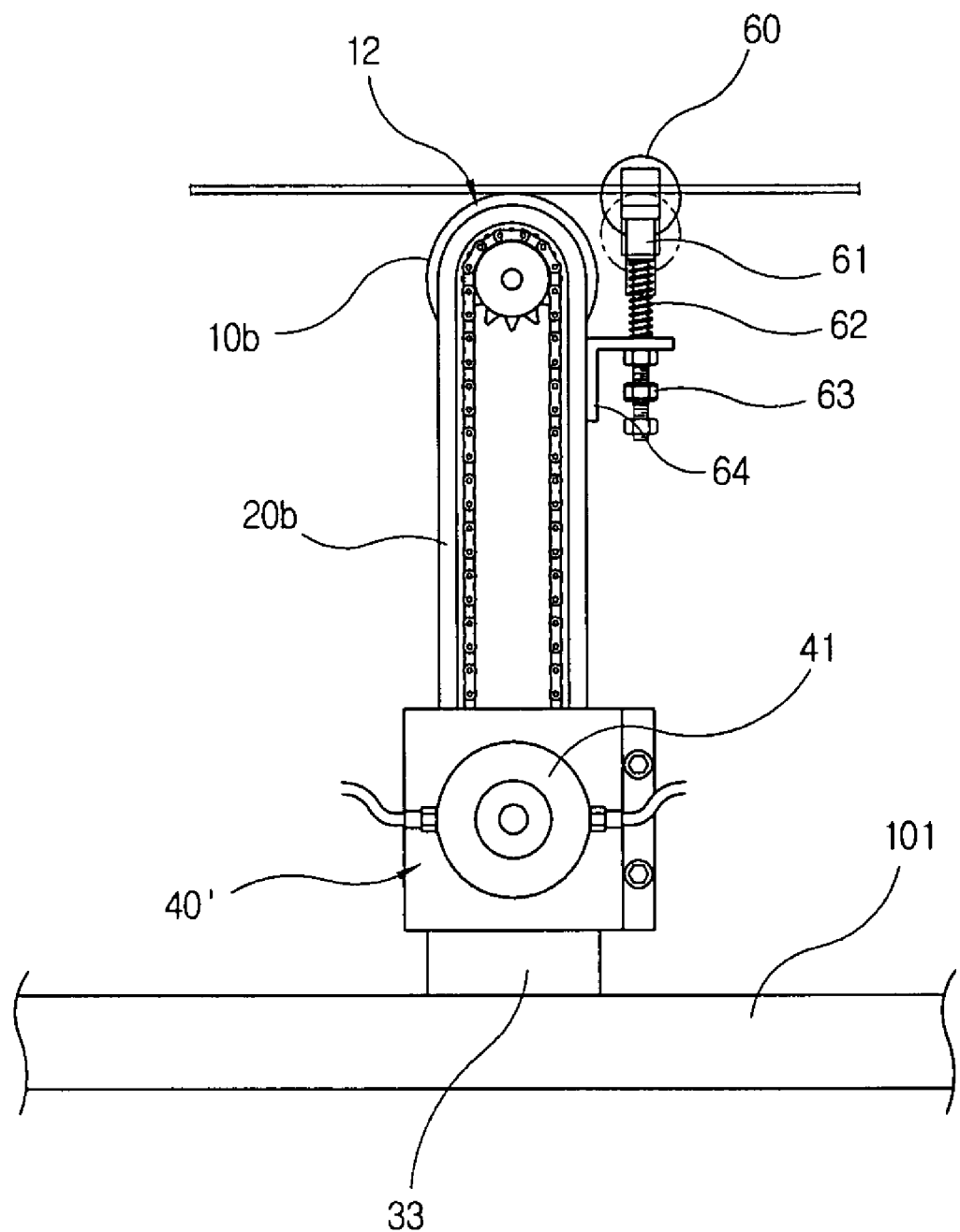
FIG. 11 is a side view showing the condition of operation of an auxiliary roller provided in the hot-air fabric welder according to the second embodiment of the present invention.

Also, in the present invention, a separate auxiliary roller 60 is mounted on one side of the upper end of the second support 20b provided with the tapered roller body 12, as shown in FIG. 11. To carry out hot-air welding of an arc section by the tapered roller body 12, the product should be fed with the orientation being kept in the direction of the arc. At this time, when the product is fed while it is supported by a single tapered roller body 12 only, the product could have crinkles due to sagging or drooping. To prevent this, an auxiliary roller 60 is installed near the tapered roller body 12 to elastically support the product from the feeding direction of various products for more smooth and stable welding work.

The auxiliary roller 60 has an angle of inclination corresponding to the angle of inclination of the tapered roller body 12, and at both ends of the auxiliary roller 60 are joined lifters 61 for supporting the auxiliary roller 60. These lifters 61 are joined to one side of the upper end of the second support 20b so as to be moved up or down according to the work product.

Also, springs 62 supported by a bracket 64 fixed on said second support 20b are inserted onto the lifters 61, and the lifters 61 are installed while being pressed upward by the springs 62. Accordingly, when the weight of the product is transmitted through the auxiliary roller 60 and the lifters 61, the lifters 61 are pressed by the weight of the product, but at this time the auxiliary roller 60 is pressed upward by the elastic force of the springs 62, so work is done at a predetermined orientation at all times.

Adjusting nuts 63 are threaded onto the bottom of the lifters 61, by which it is possible to prevent the auxiliary roller 60 and lifters 61 from lifting more than necessary and also to adjust the height of the lifting.

Third Embodiment

Figure 12:
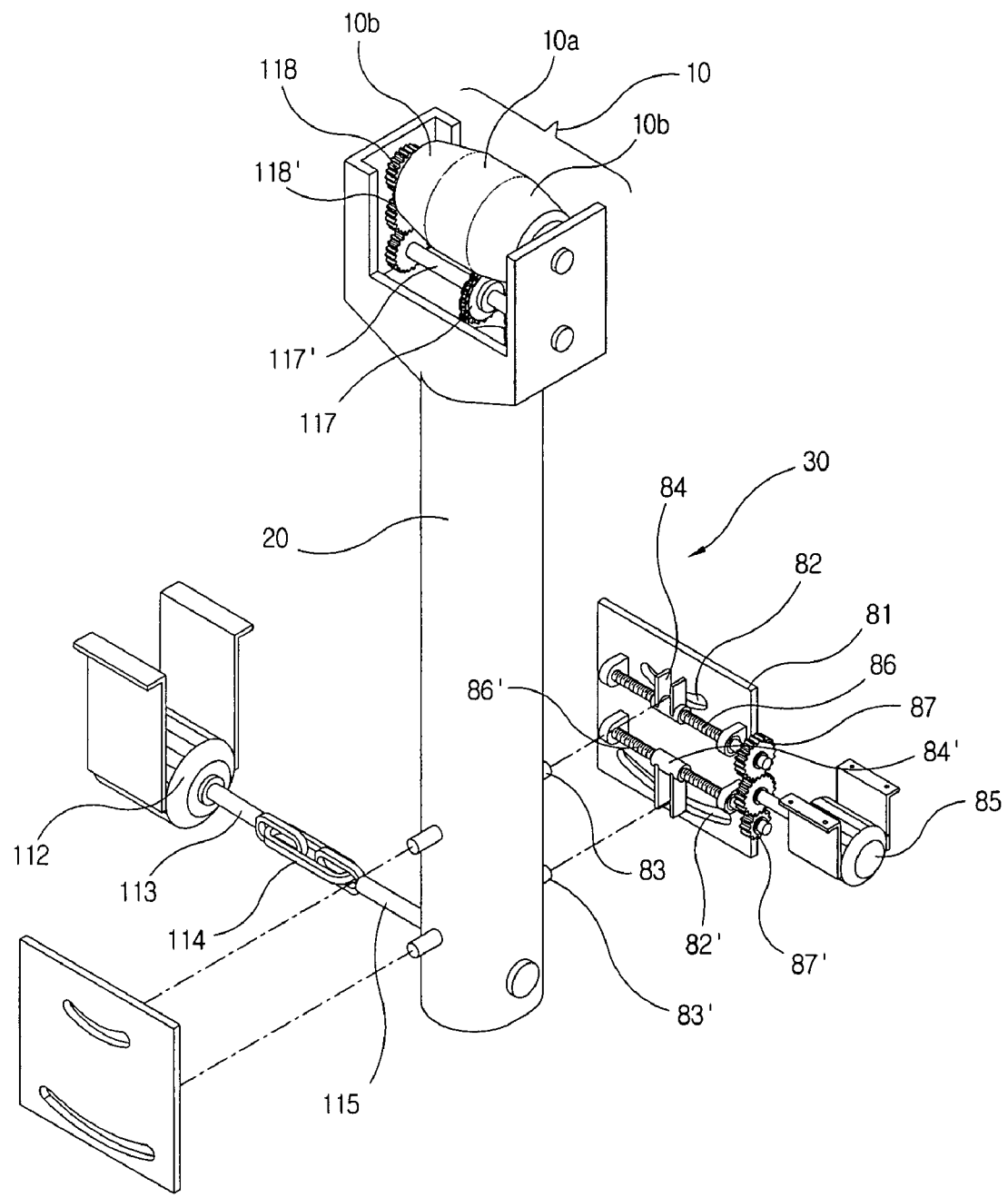
FIG. 12 is an exploded perspective view showing a hot-air fabric welder for waterproof tape according to a third embodiment of the present invention.
Figure 13:
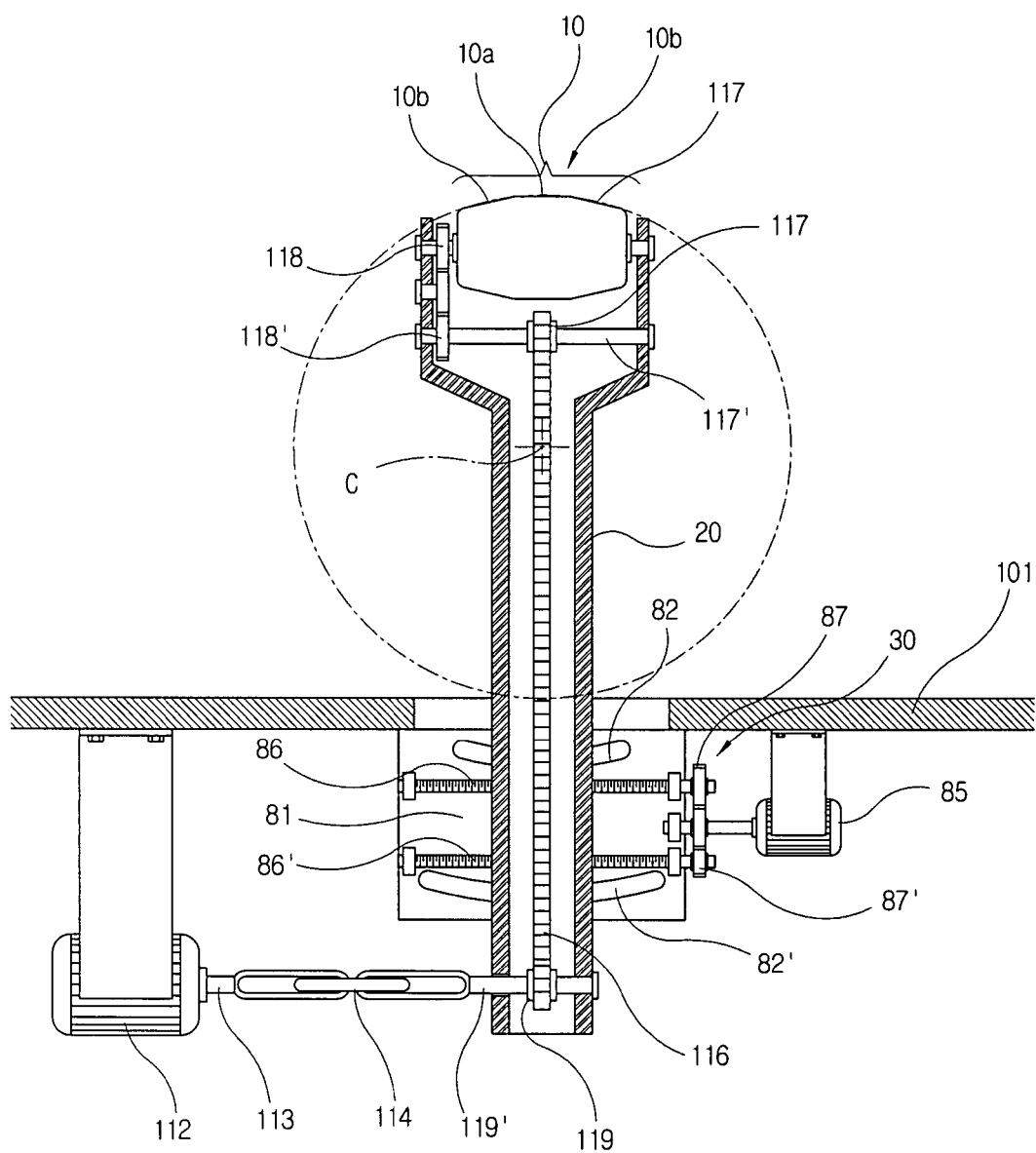
FIG. 13 is a sectional view showing the lower roller unit and the drive unit of the waterproof tape hot-air fabric welder according to the third embodiment of the present invention.

FIG. 12 is an exploded perspective view showing a hot-air fabric welder for waterproof tape according to a third embodiment of the present invention, and FIG. 13 is a sectional view showing the lower roller unit and the drive unit of the waterproof tape hot-air fabric welder according to the third embodiment of the present invention.

As shown in the drawings, both ends of the lower roller unit 10 according to the present embodiment are hinged on the roller support 20. The whole shape of the lower roller unit 10 is a cylindrical ellipsoid configuration. In the central portion of the lower roller unit 10 is formed a straight cylindrical portion 10a oriented horizontally, and on both sides of the straight portion 10a are formed tapered roller portions 10b, 10b with the center point C identical.

At this time, the lower roller unit 10 mounted on the roller support 20 is rotated by power transmitted from the drive motor 112 underneath the work table 101 of the main body 100. Inside the roller support 20 is installed vertically a chain 116, through which power from the drive motor 112 is transmitted to the lower roller unit 10. The top section of the chain 116 is wound on the first sprocket 117 fixed on the rotary axis 117', and the bottom section is wound on the second sprocket 119 fixed on the rotary axis 119'. At one end of the rotary axis 117' is fixed a drive gear 118' for transmitting the torque of the motor 112 from the chain 116 to the lower roller unit 10, and this drive gear 118' is meshed with a driven gear 118 fixed at one end of the lower roller unit 10 through an idle gear.

Also, the rotary axis 119' on which the second sprocket 119 around which the bottom section of the chain 116 is wound is connected with a power transmission axis 113 of the drive motor 112 through a universal joint 114. The universal joint 114 plays a role of transmitting the torque of the motor from the power transmission axis 113 of the drive motor 112 to the second sprocket 119 through the rotary axis 119'.

Accordingly, the torque of the drive motor 112 is transmitted in sequence through the power transmission axis 113, universal joint 114, second sprocket 119, chain 116, first sprocket 117, drive gear 118, idle gear and driven gear 118' in order to rotate the lower roller unit 10.

The roller support 20 can be pivoted to the left and right by a pivoting means 30, and during that process, the torque of the motor 112 should be continuously transmitted to the lower roller unit 10. For this purpose, the universal joint 114 with a rectangular slit structure was adopted to enable power transmission even if the angle is changed within a predetermined range. Therefore, torque is transmitted to the lower roller unit 10 continuously from the drive motor 112 irrespective of the angle and length, within a predetermined range, to make continuous work possible.

As described above, the lower roller unit 10 is composed of the straight cylindrical portion 10a, and tapered roller portions 10b formed on both sides of the straight cylindrical portion 10a, so hot welding of a straight section or a curved section becomes possible through selective use of these portions. The straight cylindrical portion 10a and tapered roller portions 10b can be shifted to an active position by pivoting the roller support 20 that is supporting the lower roller unit 10.

For this purpose, the roller support 10 can pivot to the left or right relative to the center point C of the lower roller unit 10. As guide pins 83, 83' protruding on both sides of the roller support 20 are moved along guide holes 82, 82' formed in the guide plate 81, the roller support 20 is pivoted left and right relative to the center point C of the lower roller unit 10.

To describe this in more detail, on both sides of the roller support 20 are installed guide plates 81 fixed underneath the work table 101, and in the guide plates 81 are formed guide holes 82, 82' spaced apart vertically. In these guide holes 82, 82' are inserted respectively guide pins 83, 83' which protrude on both sides of the roller support 20.

Also, on at least one guide plate 81 are arranged two lead screws 86, 86' with a predetermined vertical spacing, and shift guides 84, 84' are threaded onto these lead screws 86, 86'. During assembly, guide pins 83, 83' pass through these shift guides 84, 84' before they are inserted into guide holes 82, 82'. It is preferable that the guide pins 83, 83' are joined to the shift guides 84, 84' by an element such as a hinge pin. When the first lead screw 86 and second lead screw 86' rotate, the shift guides 84, 84' are moved left or right along the threaded lead screws 86, 86'. Thus, the guide pins 83, 83' also are moved left or right along the trajectory of the guide holes 82, 82' by the lead screws 86, 86', so that the roller support 20, which is fixed to the guide pins 83, 83', is pivoted left or right.

The first lead screw 86 and the second lead screw 86' are linked with the reversible motor 85 through a plurality of gears. That is, at one end of the first lead screw 86 and second lead screw 86' are joined a plurality of transmission gears 87, 87', so the torque from the reversible motor 85 is transmitted to the first and second lead screws 86, 86' through these transmission gears 87, 87'.

Accordingly, when the reversible motor 85 rotates, the torque from the motor 112 is transmitted to the first and second lead screws 86, 86' through the transmission gears 87, 87', and then transmitted to the roller support 20 through the shift guides 84, 84' and the guide pins 83, 83' that are fastened to the first and second lead screws 86, 86'. At this time, it is necessary to adjust the gear ratio of the transmission gears 87, 87' so that the first and second lead screws 86, 86' have different rotation velocities.

In other words, because the upper guide pin 83 operated by the first lead screw 86 and the lower guide pin 83' operated by the second lead screw 86' have different lengths from the center point C of the tapered roller portion 10b of the lower roller unit 10, the position of the center point C will change unless these guide pins 83, 83' are rotated at different velocities from each other when the roller support 20 is pivoted. By adjusting the RPM ratio of transmission gears 87, 87' in this manner, it is possible to configure the rotation velocities of lead screws differently. Accordingly, the roller support 20 can pivot to the left or right of the center point C smoothly without changing the location of the center point C.

Figure 14:
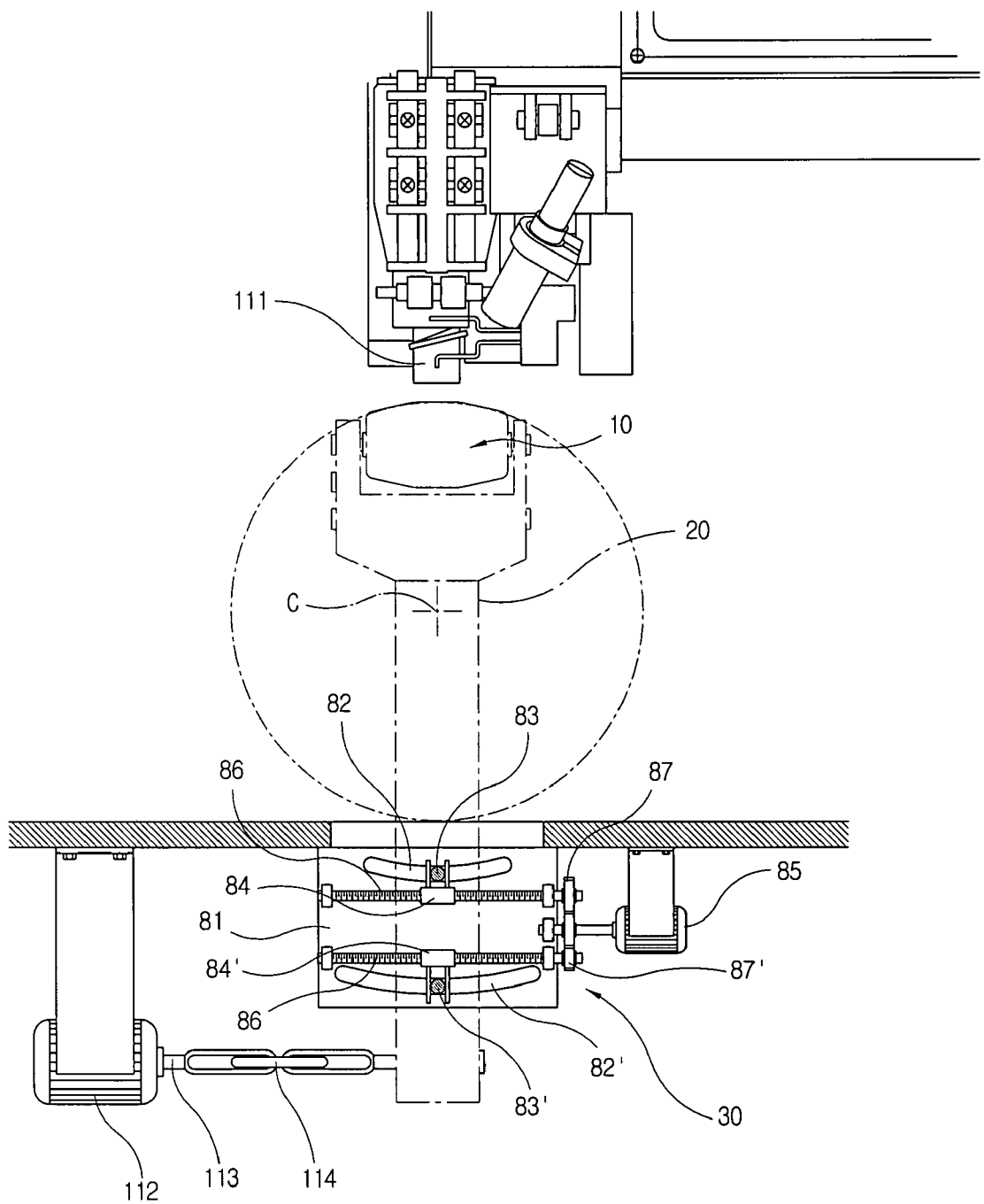
FIG. 14 is a sectional view showing the condition in which welding work is carried out on a straight section by the hot-air fabric welder illustrated in FIG. 12.
Figure 15:
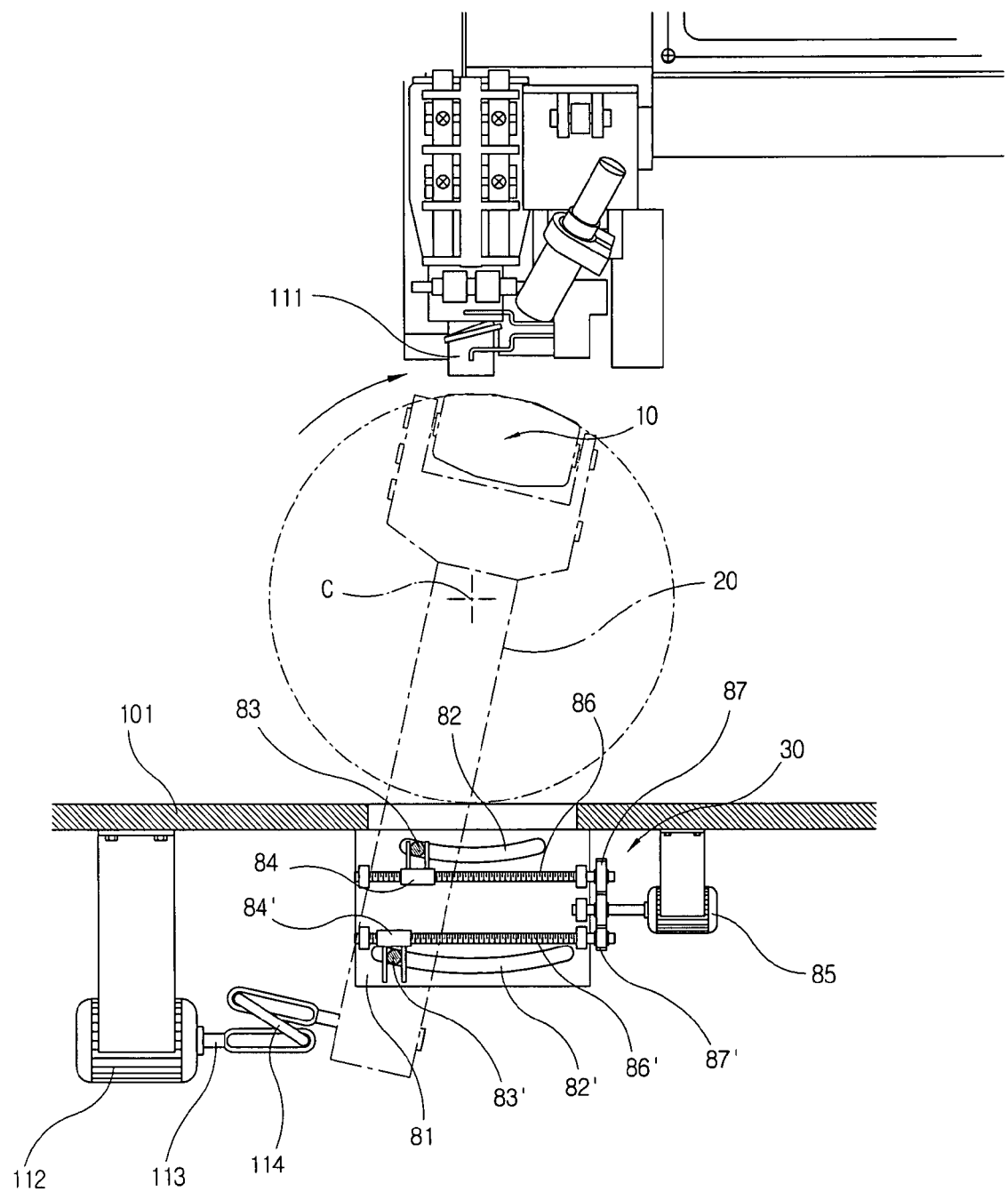
FIG. 15 is a sectional view showing the condition in which welding work is carried out on one side of an arc section by the hot-air fabric welder illustrated in FIG. 12.
Figure 16:
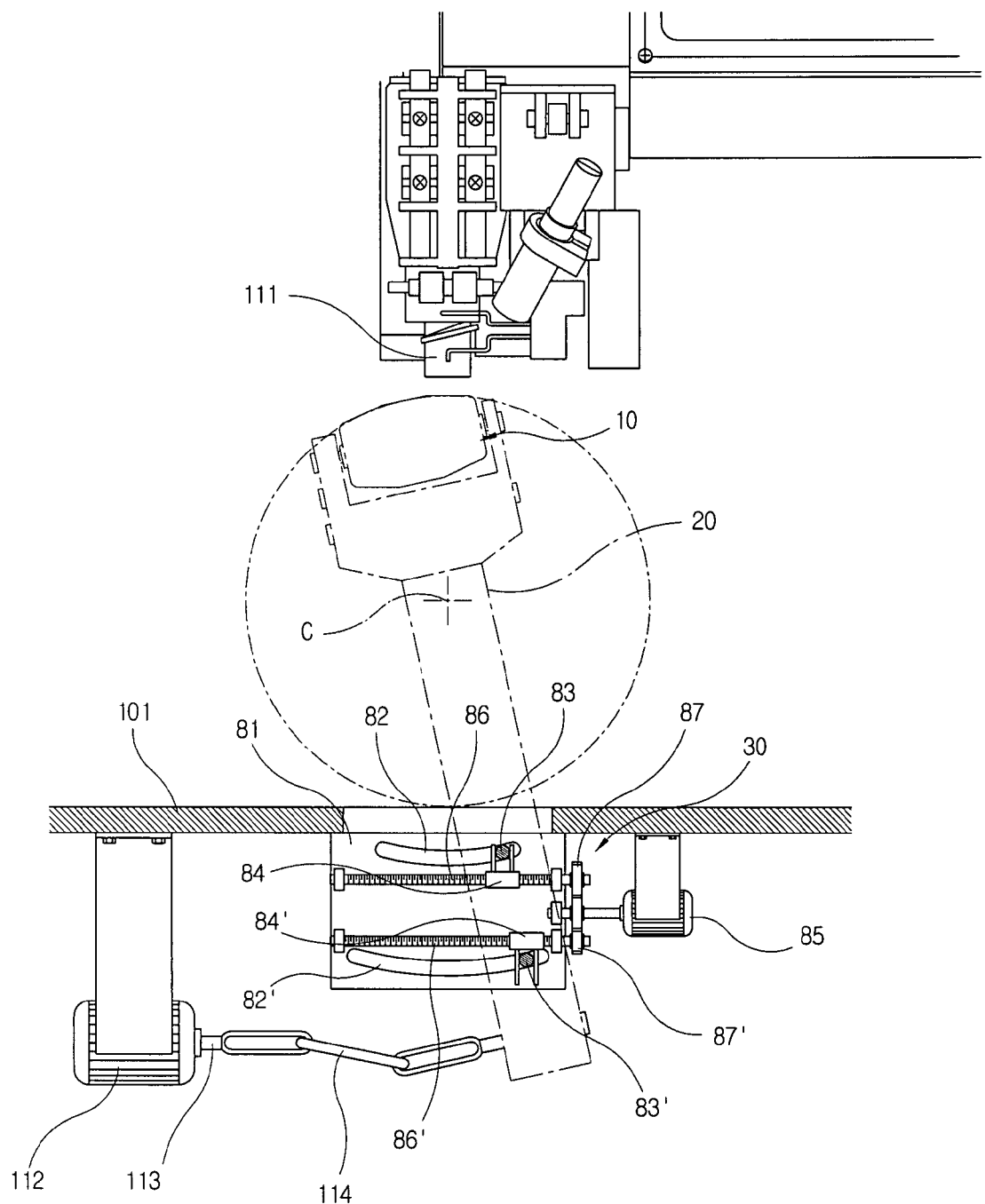
FIG. 16 is a sectional view showing the condition in which welding work is carried out on the other side of the arc section by the hot-air fabric welder illustrated in FIG. 12.

If the roller support 20 pivots like this, as shown in FIGS. 14 to 16, either the straight cylindrical portion 10a or one of the tapered roller portions 10b on each side is positioned in correspondence with the upper roller 111. That is, according to forward rotation or reverse rotation of the reversible motor 85, either the straight cylindrical portion 10a or one of the tapered roller portions 10b is positioned below the upper roller 111.

Thus, if the straight cylindrical portion 10a of the lower roller unit 10 is positioned below and in correspondence with the upper roller 111, it is possible to work on hot-air welding of a straight section of fabric, and if either one of the tapered roller portions 10b on the lower roller unit 10 is positioned in correspondence with the upper roller 111, it is possible to work on hot-air welding of the arc sections.

Namely, the tapered roller portions 10b play the role of a tapered roller, so if fabric or a product moves with the curved portion positioned in correspondence with the upper roller 111, the roller that has a diameter gradually reducing toward the outside from the straight cylindrical portion 10a of the lower roller unit 10 has a linear velocity that varies between the central portion and the end portion. Therefore, the fabric or product is moved in an arc shape by the difference of the linear velocities, so eventually the arc-shaped sewing portion can be effectively waterproofed.

Accordingly, as well as waterproofing a simple straight section or arc section, the case of straight portions and arc portions being sequentially arranged can be effectively and easily waterproofed by rotating the roller support 20 appropriately.

Fourth Embodiment

Figure 17:
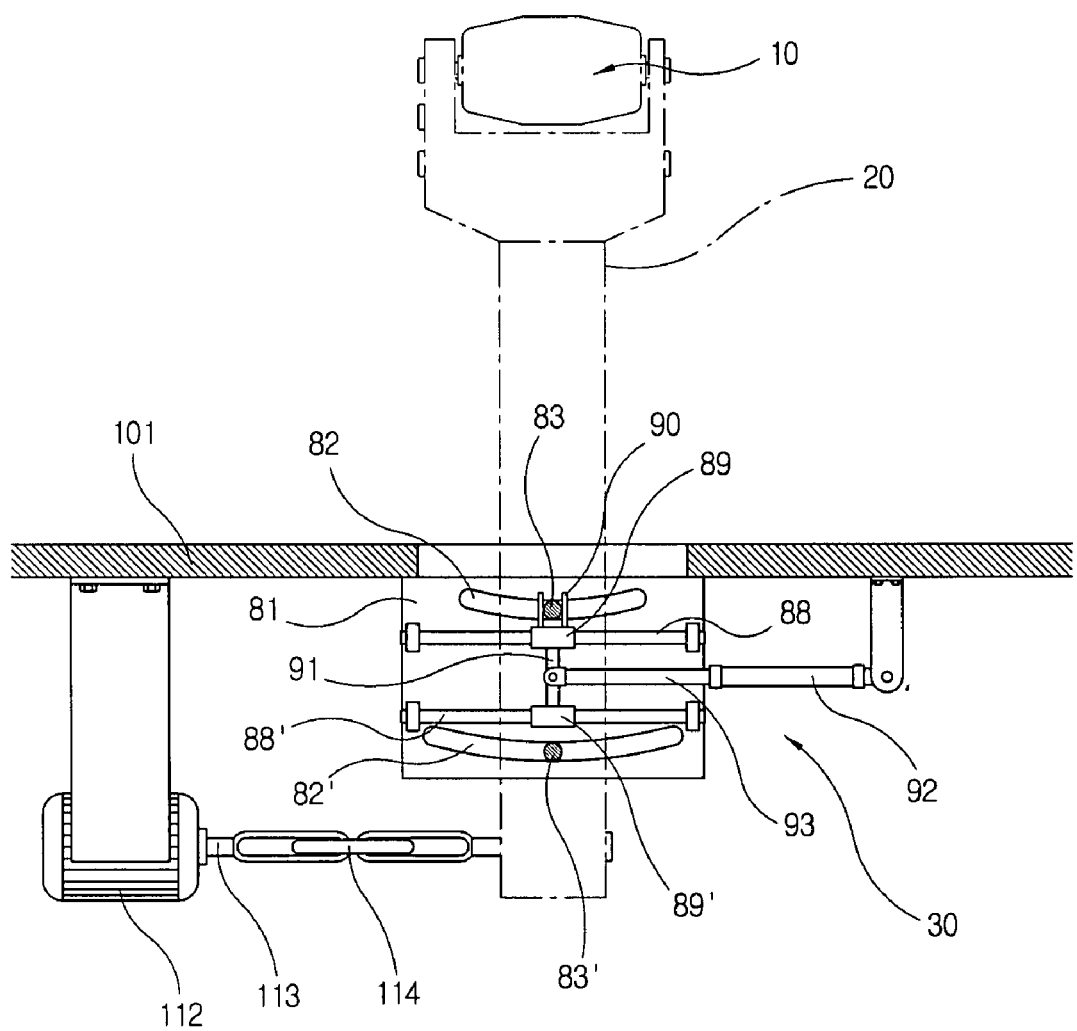
FIG. 17 is a sectional view showing the means to pivot the support of a hot-air fabric welder for waterproof tape according to a fourth embodiment of the present invention.

FIG. 17 shows a lower roller driver of a hot-air fabric welder according to a fourth embodiment of the present invention, and a different pivot means is shown. This embodiment is roughly the same as the embodiment described above, except that the structure for pivoting the roller support 20 uses a bar-shaped guide bar and actuator instead of lead screws. Therefore, to avoid repetition, the description will focus on the differences in the structure and exclude identical portions.

For the pivot of the lower roller unit 10, a guide plate 81 is fixed vertically on the work table 101 on at least one side of the roller support 20, and arc-shaped guide holes 82, 82' are formed through the guide plates 81 with a predetermined vertical spacing, and then guide pins 83, 83' protruding from the roller support 20 are inserted into the guide holes 82, 82'. Since the trajectory of the pivot motion of the roller support 20 increases in proportion to the length thereof, the pivot motion range of the lower guide pin 83' is larger than that of the upper guide pin 83. Accordingly, the length of the lower guide hole 82' into which the lower guide pin 83' is inserted is longer than that of the upper guide hole 82 into which the upper guide pin 83 is inserted.

A first guide bar 88 and a second guide bar 88', which are separated vertically, are fixed on one side of the guide plate 81, and upper and lower moving bodies 89, 89' are inserted into the outer circumference of the first and second guide bars 88, 88'. The upper moving body 89 is provided with a slide guide 90 with the upper guide pin 83 opening upward so as to join the moving body 89 and the guide pin 83 to each other. These upper and lower moving bodies 89, 89' are connected to each other by a connecting rod 91, and at the middle point of the connecting rod 91 is joined the piston rod 93 of a cylinder 92 by a hinge.

During operation, when the piston rod 93 is advanced by operation of the cylinder 92, the advancing force is transmitted to the upper and lower moving bodies 89, 89' through the piston rod 93 and the connecting rod 91, and the upper and lower moving bodies 89, 89' advance while sliding along the first guide bar 88 and second guide bar 88'.

At this time, the upper moving body 89 is joined with the upper guide pin 83 of the roller support 20 through the slide guide 90, so when the upper moving body 89 advances, the upper guide pin 83 moves along the upper guide hole 82 on the arc due to the motion of the slide guide 90. Simultaneously, the lower guide pin 83' slides along the lower guide hole 82' on the arc, so the roller support 20 pivots to the left or right more stably.

Also in the case of backward operation of the cylinder 92, as described above, the backward force of the cylinder 92 is transmitted through the piston rod 93 and connecting rod 91 to the upper and lower moving bodies 89, 89' to move these backward, and at the same time, the upper moving body 89 that slides along the upper guide bar 88 moves the upper slide guide 90 backward, while the lower guide pin 83' slides along the lower guide hole 82', so that the roller support 20 can pivot in the direction opposite to that described above.

Fifth Embodiment

Figure 18:
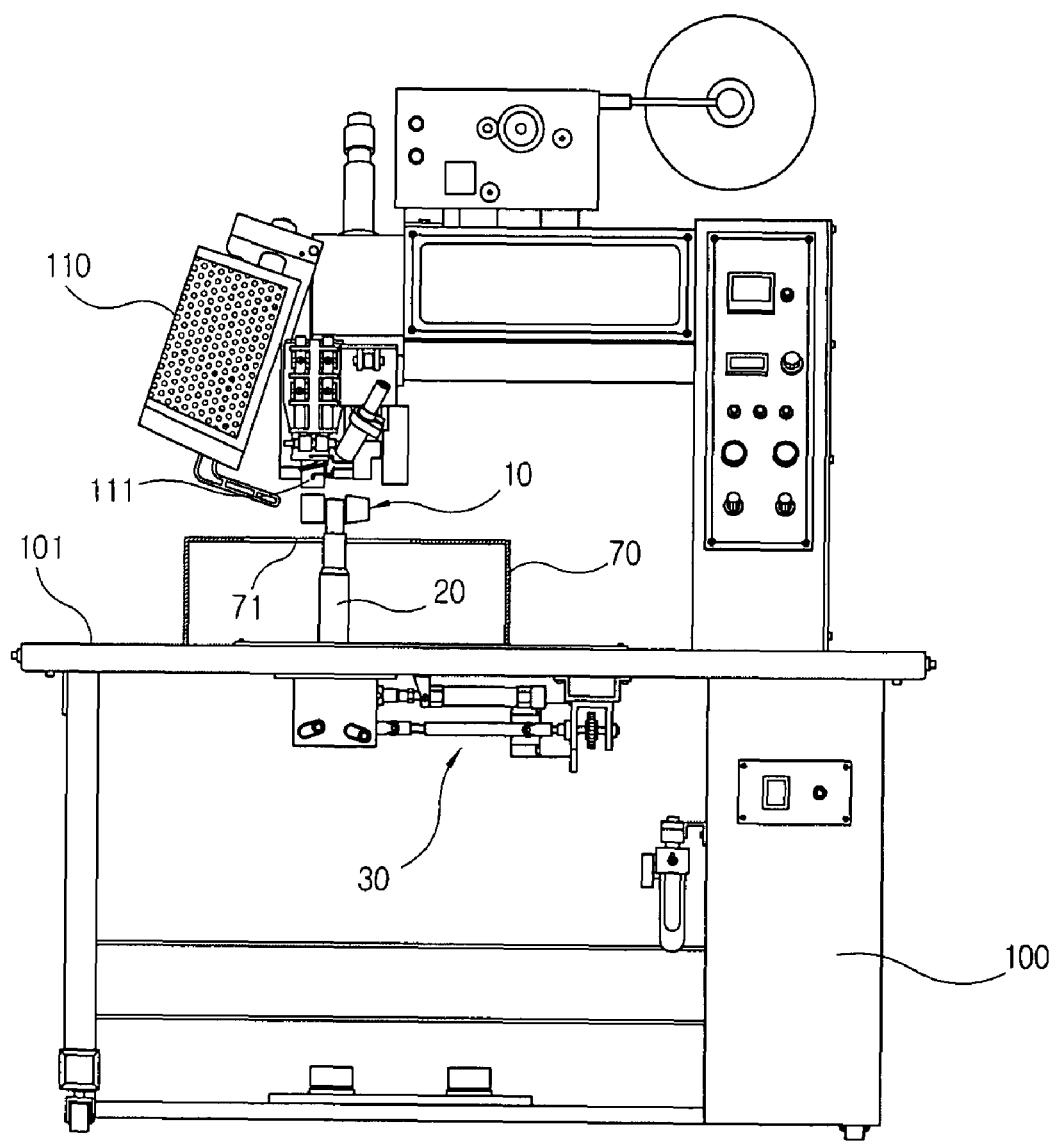
FIG. 18 is a sectional view showing a hot-air fabric welder for waterproof tape provided with a cover mounted on the worktable according to a fifth embodiment of the present invention.

FIG. 18 is a sectional view showing a hot-air fabric welder for waterproof tape provided with a cover mounted on the worktable according to a fifth embodiment of the present invention.

The upper part of the work table 101 can be configured in such a way that it is covered with a cover 70 made of bent-up plate and the support 20 can pivot within the internal space of the cover 70. The cover 70 can prevent contact of the worker's body and the product with the rotating support 20 and also prevent interference with or obstruction by the moving product so that work can be carried out faster and more reliably. On the top of the cover 70 is formed a rectangular opening 71 of the extent that the vertically positioned lower roller unit 10 can move left or right without interference. Therefore, a vertically positioned lower roller unit 10 protrudes upward through the opening 71.

Although the present invention has been described in detail with reference to its presently preferred embodiment, it will be understood by those skilled in the art that various modifications and equivalents can be made without departing from the spirit and scope of the present invention, as set forth in the appended claims.

What is claimed is:

1. A hot-air fabric welder for waterproof tape comprising a main body having a flat work table, a hot-air generating means and an upper roller fitted above the work table, a lower roller unit fitted below said upper roller by a support, the hot-air fabric welder comprising:

a lower roller unit (10) comprises a flat roller portion (10*a*) with a uniform circumference and a tapered roller portion (10*b*) with a circumference that varies from one end to the other, and either the flat roller portion (10*a*) or the tapered roller portion (10*b*) can be arranged in turn to correspond to the upper roller (111) by pivoting of the support (20) that is driven by the drive of a pivoting means (30), and a straight welded portion is produced when the flat roller portion (10*a*) is arranged below and in correspondence to the upper roller (111) according to the rotation of said support (20), and a welded portion of arc shape is selectively produced when the tapered roller portion (10*b*) is arranged below and in correspondence to the upper roller (111).

2. The hot-air fabric welder of claim 1, wherein the lower roller unit (10) is formed with a flat roller body (11) having a flat roller portion (10*a*) and a tapered roller body (12) having a tapered roller portion (10*b*) of varying circumference that are mounted on both sides of the upper end of a single support (20), and the support (20) is rotated by the drive of the pivoting means (30) so as to position either the flat roller body (11) or the tapered roller body (12) below and corresponding to the upper roller (111).

3. The hot-air fabric welder of claim 1, wherein the lower roller unit (10) is formed with a flat roller body (11) having a flat roller portion (10*a*) and a tapered roller body (12) having a tapered roller portion (10*b*) of varying circumference that are mounted on the upper ends of a first support (20*a*) and a second support (20*b*), respectively, and the supports (20*a*, 20*b*) are rotated by the drive of the pivoting means (30) so as to position either the flat roller body (11) or the tapered roller body (12) below and corresponding to the upper roller (111).

4. The hot-air fabric welder of claim 1, wherein a flat roller portion (10*a*) is formed in the center of the lower roller unit (10), and a tapered roller portion (10*b*) is integrally formed on both sides of the flat roller portion (10*a*), and the support (20) is rotated by the drive of the pivoting means (30), so as to position either the flat roller portion (10*a*) or one of the tapered roller portions (10*b*) that are formed on a single lower roller unit (10) below and corresponding to the upper roller (111).

5. The hot-air fabric welder of claim 1, wherein the lower roller unit (10) is rotated by power transmitted from the drive motor (112) installed inside of the main body (100), and transports fabric that is fed between the upper roller (111) and the lower roller unit (10).

6. The hot-air fabric welder of claim 5, wherein a rotating axle (115) is connected by a universal joint (114) to the end portion of a power transmission axle (113) that is connected with the drive motor (112) installed inside of the main body (100), and the end portion of the rotating axle (115) is linked to a chain (116) that is wound on said lower roller (10), so that the torque of said drive motor (112) is transmitted to said lower roller unit (10) through said rotating axle (115) and chain (116) to rotate them.

7. The hot-air fabric welder of claim 5, wherein a driven gear (118) is installed at one end of the roller axis to which the lower roller unit (10) is fixed, and a drive gear (118') that is meshed with the driven gear (118) through an idle gear is installed at one end of the rotating axle (117') to which a first sprocket (117) is fixed, and upon which the top end of the chain (116) located vertically inside the support (20) is wound, so that power transmitted from the drive motor (112) is transmitted by the chain (116) to said lower roller unit (10) through the gears (118', 118), and at one end of the rotating axle (119') is fixed a second sprocket (119) around which the bottom end of said chain (116) is wound, so that the torque of the drive motor (112) transmitted through the power transmission axle (113) is transmitted to the rotating axle (117) through the chain (116).

8. The hot-air fabric welder of claim 7, wherein the end portion of the rotating axle (119') of the second sprocket (119) and the end portion of the power transmission axle (113) of the drive motor (112) are connected to each other by the universal joint (114), so that power transmission is possible within the range of a predetermined angle and length.

9. The hot-air fabric welder of claim 1, wherein the pivoting means (30) for rotating the support (20) includes an actuator (102) mounted inside of the main body (100), and the end portion of the actuator (102) is hinged to the bottom end of the support (20), so that the support (20) is pivoted by operation of the actuator (102) to adjust the angle of said lower roller unit (10).

10. The hot-air fabric welder of claim 1, wherein the pivoting means (30) for rotating the support (20) includes:

a guide block (34), which is mounted beneath the work table (101), and has inclined slit holes (31) on both sides;

a movable block (33), which is inserted inside of the guide block (34), and has guide pins (32) inserted into said slit holes (31); and an actuator (102) mounted inside of the main body (100), wherein one side of said movable block (33) is connected to the actuator (102), so that said movable block (33) is moved along the slit holes (31) of the guide block (34) according to the action of said actuator (102) to adjust the angle of the support (20) fixed to said movable block (33).

11. The hot-air fabric welder of claim 10, wherein if said guide pins (32) are positioned at one end of the slit holes (31) of the guide block (34), then the flat roller portion (10*a*) is positioned below and in opposition to the upper roller (111), and if said guide pins (32) are positioned at the other end of the slit holes (31) of the guide block (34), then the tapered roller portion (10*b*) is positioned below and in opposition to the upper roller (12).

12. The hot-air fabric welder of claim 1, wherein said support (20) consists of a first support (20*a*) and second support (20*b*), and these supports (20*a*, 20*b*) are pivoted individually by operating means (40, 40'), and at the upper end of said first support (20*a*) is mounted a flat roller body (11) having a flat roller (10*a*), and at the upper end of said second support (20*b*) is mounted a tapered roller body having a tapered roller portion (10*b*).

13. The hot-air fabric welder of claim 12, wherein each of the operating means (40, 40') includes a hydraulic motor (41) attached to said movable block (33), and the motor rotation axis (42) of the hydraulic motor (41) is joined to said first support (20*a*) and second support (20*b*) respectively, so as to rotate the first support (20*a*) and second support (20*b*) individually and independently through rotation of the hydraulic motor (41).

14. The hot-air fabric welder of claim 12, wherein on one side of said second support (20*b*) is mounted an auxiliary roller (60) that is movable up and down by a bracket (64) of bent shape, and a lifter (61) arranged below said auxiliary roller (60) is elastically supported by a spring (62) installed on the bracket (64) fixed on said second support (20*b*), so as to press the auxiliary roller (60) upward by the reaction force of the spring (62), and onto the lower end of the lifter (61) is threaded a height-adjustable adjusting nut (63).

15. The hot-air fabric welder of claim 1, wherein a cover (70) of bent plate is mounted on the work table (101) and either the flat roller portion (10a) or the tapered roller portion (10b) vertically positioned below the upper roller (111) is singly exposed through an opening (71) of the cover (70).

16. The hot-air fabric welder of claim 4, wherein the tapered roller portions (10b) formed on both sides of the lower roller unit (10) have a curved surface, and the tapered roller portions (10b) have a circle center (C) of mutually identical positions, and the circle center (C) is located on the vertical centerline of the lower roller unit (10).

17. The hot-air fabric welder of claim 1, wherein the pivoting means (30) for rotating the support (20) includes a guide plate (81), which is installed vertically to the worktable (101) at least on one side of the support (20), and has arc-shaped guide slots (82, 82') with a predetermined vertical spacing;

guide pins (83, 83') one end of each of which is fixed to said support (20) and the other end of which is inserted into said guide slots (82, 82') such that it can slide therein;

a reversible motor (85) attached underneath the worktable (101);

a first and second lead screw (86, 86') installed on said guide plate (81) on one side to split and transmit the power from said reversible motor (85) through a plurality of gears (87, 87'); and shift guides (84, 84') to which said first and second lead screws (86, 86') are fastened and the middle portions of said guide pins (83, 83') are joined; wherein if the first and second lead screws (86, 86') are rotated simultaneously according to the rotation of said reversible motor (85), the shift guides (84, 84') mounted on the first and second lead screws (86, 86') cause the guide pins to move (83, 83') so as to pivot said support (20).

18. The hot-air fabric welder of claim 17, wherein one end of said first and second lead screw (86, 86') is provided with transmission gears (87, 87') that are meshed with the drive gear of the reversible motor (85), and these transmission gears (87, 87') rotate the first and second lead screw (86, 86') at different speeds during pivoting of the support (20), so that the flat roller portion (10a) and tapered roller portion (10b) of the lower roller unit (10a) have a gear ratio so as to be positioned below and in correspondence to the upper roller (111) without deviation.

* * * * *